(12) United States Patent
Nguyen

(10) Patent No.: US 6,866,099 B2
(45) Date of Patent: *Mar. 15, 2005

(54) METHODS OF COMPLETING WELLS IN UNCONSOLIDATED SUBTERRANEAN ZONES

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 114 days.

This patent is subject to a terminal disclaimer.

(21) Appl. No.: 10/365,727

(22) Filed: Feb. 12, 2003

(65) Prior Publication Data
US 2004/0177961 A1 Sep. 16, 2004

(51) Int. Cl.$^7$ .............................................. E21B 43/08
(52) U.S. Cl. ............................. 166/308.1; 166/280.1; 166/280.2
(58) Field of Search .......................... 166/308.1, 280.1, 166/280.2, 384, 207

(56) References Cited

U.S. PATENT DOCUMENTS

| | | | |
|---|---|---|---|
| 4,829,100 A | 5/1989 | Murphey et al. | |
| 5,005,645 A | 4/1991 | Jennings, Jr. et al. | |
| 5,232,961 A | 8/1993 | Murphey et al. | |
| 5,598,890 A | 2/1997 | Richard et al. | |
| 5,853,048 A | 12/1998 | Weaver et al. | |
| 5,871,049 A | 2/1999 | Weaver et al. | |
| 5,934,376 A | * 8/1999 | Nguyen et al. | 166/278 |
| 5,964,289 A | 10/1999 | Hill | |
| 6,003,600 A | 12/1999 | Nguyen et al. | |
| 6,016,870 A | 1/2000 | Dewprashad et al. | |
| 6,047,772 A | 4/2000 | Weaver et al. | |
| 6,165,947 A | 12/2000 | Chang et al. | |
| 6,233,966 B1 | * 5/2001 | Delpuech et al. | 62/374 |
| 6,325,149 B1 | 12/2001 | Dobson, Jr. et al. | |
| 6,494,261 B1 | * 12/2002 | Pahmiyer | 166/281 |
| 6,659,179 B2 | * 12/2003 | Nguyen | 166/227 |
| 2002/0179302 A1 | * 12/2002 | Nguyen | 166/279 |
| 2003/0042023 A1 | * 3/2003 | Arnold, III | 166/280 |
| 2003/0106697 A1 | * 6/2003 | Bode et al. | 166/381 |
| 2003/0131999 A1 | 7/2003 | Nguyen et al. | 166/280 |
| 2003/0196796 A1 | * 10/2003 | Lauritzen et al. | 166/227 |
| 2004/0129419 A1 | * 7/2004 | Van Wulfften Palthe | 166/278 |

FOREIGN PATENT DOCUMENTS

| | | | | |
|---|---|---|---|---|
| EP | 0 426 427 B1 | 12/1994 | ........... | E21B/43/04 |
| EP | 0 909 874 A2 | 4/1999 | ........... | E21B/43/02 |
| EP | 0 933 498 A1 | 8/1999 | ........... | E21B/43/02 |

* cited by examiner

Primary Examiner—William Neuder
(74) Attorney, Agent, or Firm—Robert A. Kent; C. Clark Dougherty, Jr.

(57) ABSTRACT

The current invention provides improved methods of completing wellbores penetrating unconsolidated and poorly consolidated subterranean zones. The methods basically comprise the steps of placing a coated proppant in fractures penetrating the subterranean zone, allowing the coated proppant to cure or set as a fluid permeable barrier to particulate matter and expanding an expandable well screen located adjacent to the fractures.

39 Claims, 3 Drawing Sheets

METHODS OF COMPLETING WELLS IN UNCONSOLIDATED SUBTERRANEAN ZONES

BACKGROUND OF THE INVENTION

The present invention relates to improved methods of completing wells in poorly consolidated and unconsolidated subterranean zones. More particularly, the present invention provides methods for reducing or precluding the migration of fines and sand with the fluids produced from such wells without obstructing the borehole.

Oil and gas wells are often completed in unconsolidated formations containing loose and incompetent fines and sand. This particulate matter commonly migrates with fluids produced by the wells into the production tubing and equipment. The presence of particulate matter in the produced fluids is disadvantageous and undesirable in that the particles abrade pumping and other producing equipment. Additionally, accumulation of particulate matter in gaps between the casing and the producing formation reduces the well's fluid production capabilities.

A common method for improving fluid production from an unconsolidated zone entails fracturing the production zone and holding the resulting fracture open with proppant. Proppant flowback during subsequent fluid production is a common problem. As protection against production of particulate matter entrained within the produced fluids, filters known as gravel packs are commonly used in the production zone of unconsolidated subterranean zones.

In a typical gravel pack completion, a screen is placed in that portion of the wellbore passing through the unconsolidated subterranean zone to be completed. The screen is typically connected to a tool, which includes a production packer and a cross-over. The tool is in turn connected to a work or production string. The gravel pack is formed by pumping graded sand, known in the art as gravel, down the work or production string and through the cross-over as a slurry. The slurry eventually flows into the annulus between the screen and the wellbore wall or casing. The liquid portion of the slurry leaks off into the subterranean zone and/or through the screen, which is sized to prevent passage of the sand in the slurry. As a result, the sand is deposited in the annulus around the screen forming a gravel pack. The size of the sand in the gravel pack is selected such that it prevents formation fines and sand, referred to herein as particulate matter, from flowing into the wellbore with produced fluids.

One common problem encountered during the gravel packing process is the formation of sand bridges. In particular, gravel packing of long and/or deviated unconsolidated producing intervals frequently results in the formation of sand bridges in the annulus. Sand bridges are characterized by non-uniform sand packing of the annulus between the screen and the wellbore. This often occurs as a result of the loss of carrier liquid from the slurry into high permeability portions of the subterranean zone. The loss of fluid causes the formation of sand bridges in the annulus before all the sand has been placed. The sand bridges block further flow of the slurry through the annulus creating voids below the bridges formed. When the well is placed on production, the flow of produced fluids is concentrated through the voids in the gravel pack leading to erosion of the screen and eventually migration of fines and sand with the produced fluids.

In an attempt to prevent the formation of sand bridges in gravel pack completions, special screens with internal bypass tubes have been developed. Such screens have achieved varying degrees of success in avoiding sand bridges; however, these devices and the gravel packing procedure are very costly. Additionally, gravel packs and associated equipment obstruct the borehole. As result, the gravel pack must be removed and replaced anytime lower regions of the well require servicing or accessing for additional completion. Removal and replacement of the gravel packs adds significantly to the costs of well operations.

Thus, there are needs for improved methods of completing wells in unconsolidated subterranean zones whereby the migration of particulate matter with produced fluids can be economically and permanently prevented while allowing the efficient and economical production of hydrocarbons from the unconsolidated producing zone.

SUMMARY OF THE INVENTION

The current invention provides improved methods for completing wellbores penetrating unconsolidated or poorly consolidated subterranean formations. The improved methods include the steps of fracturing the subterranean formations and filling at least a portion of each fracture with a coated proppant. The coating on the proppant is allowed to set or cure thereby consolidating the proppant as a fluid permeable barrier. Subsequently, an expandable well screen is positioned and expanded within the wellbore adjacent to the fractures.

In another embodiment, the current invention provides a method for completing a wellbore penetrating an unconsolidated subterranean zone. The method comprises placing a casing, in the portion of the wellbore penetrating the subterranean zone. Following casing installation, the subterranean zone of interest is perforated. The wellbore is then isolated with one or more packers before a fracturing treatment is performed. During the proppant stage of the fracturing process, standard proppant may be used within the fractures; however, at a predetermined time a proppant coated or at least partially coated with a hardenable resin, or a tackifying agent, or a combination thereof is used. If desired, the coated proppant may be used for the entire fracturing process. The coating on the proppant is allowed to set or cure. Subsequently, an expandable well screen is placed in the wellbore adjacent to the resulting fractures and expanded to press against the interior of the casing. When expanded, the screen substantially conforms to the interior of the casing leaving an unobstructed passage through the wellbore. Following expansion, the screen has a mesh size selected to inhibited passage of proppant into the production pipe string.

In yet another embodiment, the current invention provides a method for completing a wellbore penetrating an unconsolidated subterranean zone. The method comprises placing a casing, optionally perforated prior to or after installation, in the portion of the wellbore penetrating the subterranean zone. Following installation of the casing, the subterranean zone is fractured using a fluid containing a proppant. Initially, the fracturing process may utilize an untreated proppant; however, at a predetermined time a proppant coated or at least partially coated with a hardenable resin, a tackifying agent or a combination thereof is used. The switch to a coated proppant occurs at a point in time sufficient to ensure that at least thirty percent of the fracture adjacent to the wellbore contains coated proppant. Preferably the coated proppant is used for the entire fracturing process. Further, the wellbore may be filled with the coated proppant. The coated proppant may also fill the annulus between the casing and the walls of the wellbore. Following fracturing, the coated proppant is set or allowed to set thereby forming a solid or nearly solid fluid permeable mass. Following setting of the coated proppant, an expandable well screen is placed in the wellbore adjacent to the resulting fractures and expanded to press against the interior of the casing. When expanded, the screen substantially conforms to the interior of the casing leaving an unobstructed passage through the wellbore. Following expansion, the screen has a mesh size selected to inhibited passage of proppant into the production pipe string.

In still another method, the current invention provides a method for completing a wellbore penetrating a subterranean formation. The method of the current invention comprises placing a casing in the portion of the wellbore penetrating the subterranean formation and fracturing the subterranean formation with a fluid containing a proppant. At least 30% of the region of each resulting fracture adjacent to the wellbore is filled with a coated proppant. Additionally, the annulus around the casing in the region of the fracture is filled with a coated proppant. Thereafter, the coating on the proppant is allowed to set or cure. Subsequently, an expandable well screen is located within the casing adjacent to the fractures and expanded.

Therefore, a general object of the present invention is to provide improved methods of completing wells in poorly consolidated and unconsolidated subterranean zones. Further objects, features and advantages of the present invention will be readily apparent to those skilled in the art upon a reading of the description of preferred embodiments in conjunction with the accompanying drawings.

DETAILED DESCRIPTION OF THE CURRENT INVENTION

The present invention provides improved methods of completing and fracture stimulating unconsolidated subterranean zones penetrated by a wellbore. As used herein, the term "unconsolidated subterranean zones" refers to poorly consolidated and unconsolidated subterranean zones. The current invention is useful in all types of wells including but not limited to cased and uncased wells as well as vertical and directionally drilled wells. The term "coated proppant" refers to a proppant substrate coated or partially coated with a hardenable resin, a tackifying agent or a combination thereof.

Figure 1:
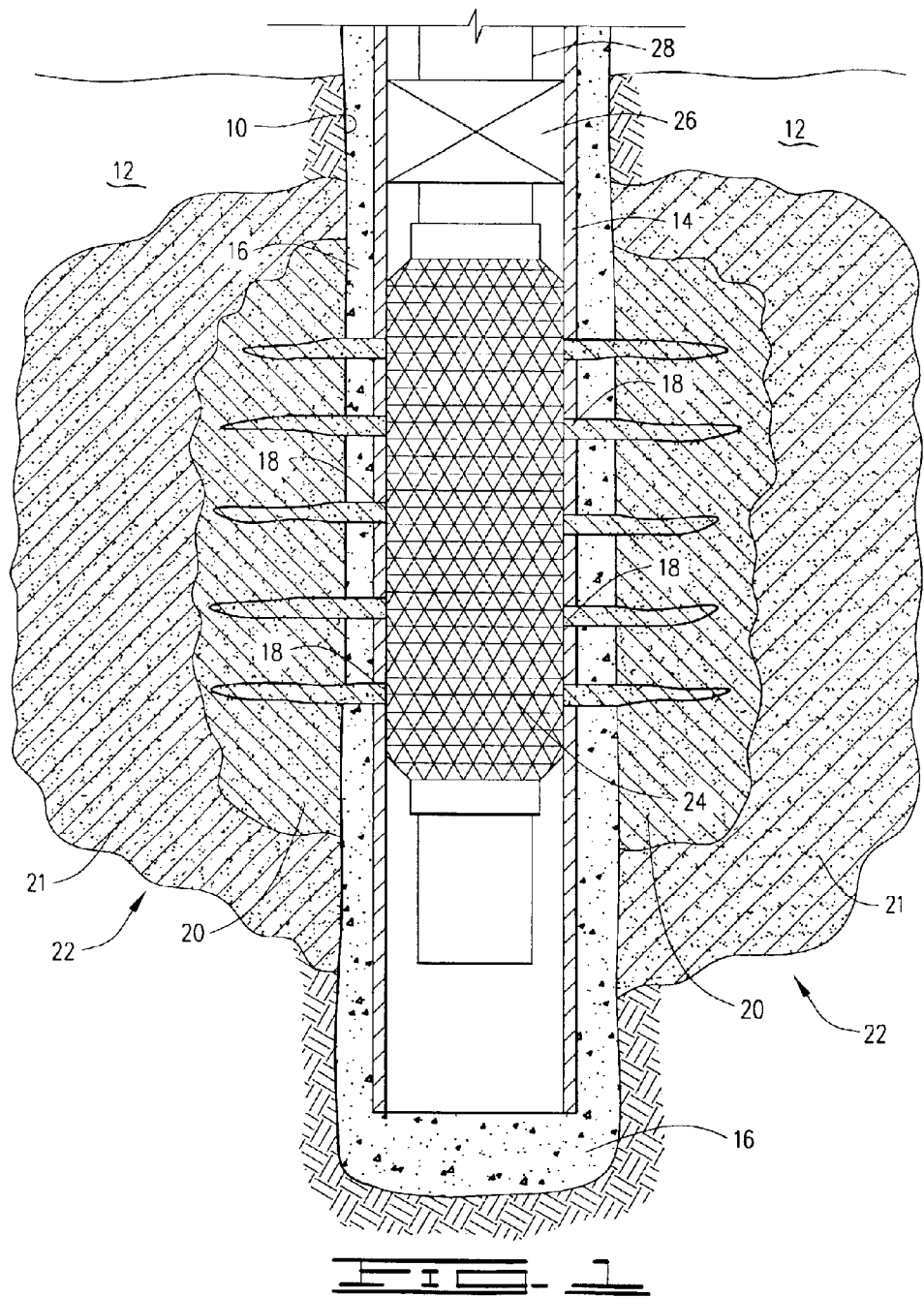
FIG. 1 is a side cross-sectional view of a wellbore penetrating an unconsolidated or poorly consolidated subterranean producing zone including a perforated casing cemented in the wellbore, an expanded well screen connected to a production pipe string by a packer and having coated proppant located in fractures penetrating the subterranean producing zone.
Figure 2:
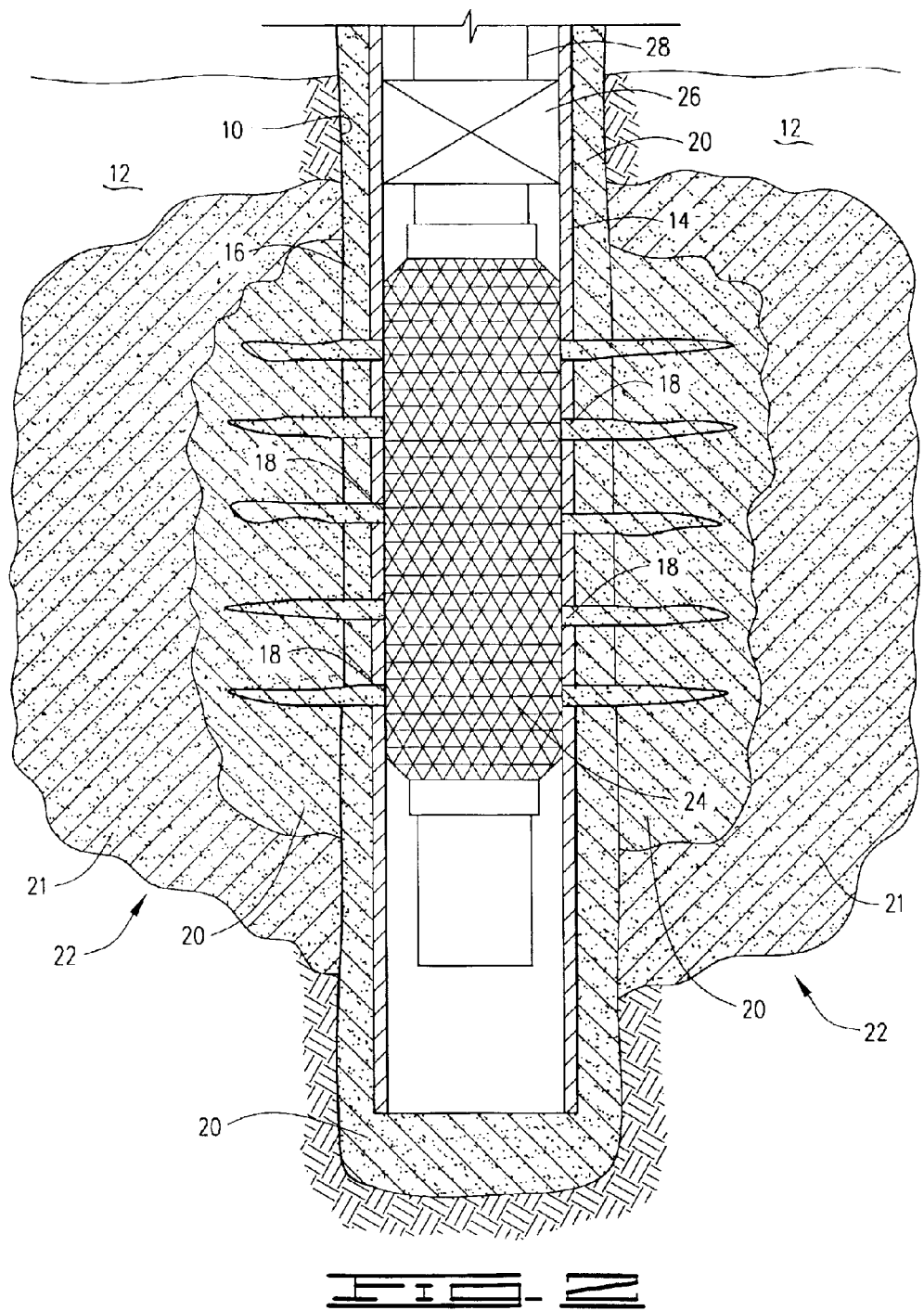
FIG. 2 is a side cross-sectional view of a wellbore penetrating an unconsolidated or poorly consolidated subterranean producing zone including a perforated casing, an expanded well screen connected to a production pipe string by a packer and having coated proppant surrounding the perforated casing and located in fractures penetrating the subterranean producing zone.
Figure 3:
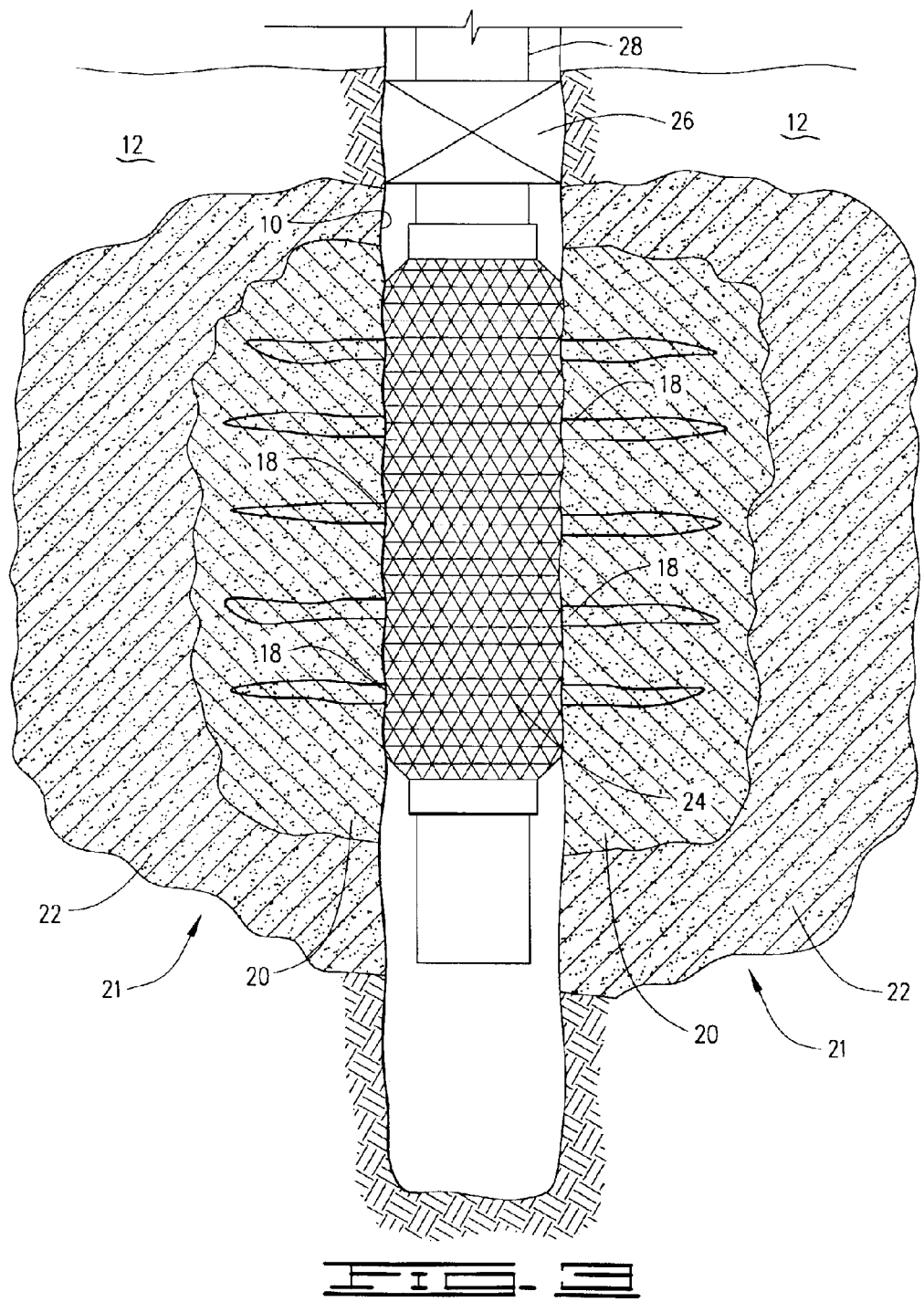
FIG. 3 is a side cross-sectional view of an openhole wellbore penetrating an unconsolidated or poorly consolidated subterranean producing zone including an expanded well screen connected to a production pipe string by a packer and having hardened resin coated proppant located in fractures penetrating the subterranean producing zone.

Referring now to the drawings, FIGS. 1 and 2 depict application of the current invention in a cased wellbore 10 while FIG. 3 depicts the application of the current invention in an uncased wellbore 10. In each instance, wellbore 10 penetrates a portion of at least one subterranean formation 12. FIG. 1 depicts a casing 14 bonded within wellbore 10 by a cement sheath 16. Casing 14 has a plurality of perforations 18 produced by conventional methods such as a perforating gun. Perforations 18 extend through cement sheath 16 and into subterranean zone 12. In contrast to FIG. 1, FIG. 2 depicts an unbonded perforated casing 14 within wellbore 10. FIG. 3 differs from FIGS. 1 and 2 by the absence of a casing.

Following preparation of wellbore 10 by conventional means such as casing, cementing, perforating or by installation of a perforated casing without cementing, subterranean formation 12 must be stimulated to aid in production of fluid. One stimulation method hydraulically fractures subterranean formation 12. As known to those skilled in the art, the hydraulic fracturing process pumps a viscous liquid, typically containing a suspended proppant 21 into the formation at a rate and pressure sufficient to fracture subterranean formation 12. The continued pumping of the fracturing fluid extends the fracture 22 into formation 12 and carries proppant 21 into fracture 22. Upon the reduction of the flow of the fracturing fluid and the reduction of pressure exerted on the formation, proppant 21 is deposited in fracture 22 preventing them from closing. Thus, proppant 21 maintains fracture 22 in the open position thereby providing an improved fluid path from deep within subterranean zone 12 to wellbore 10.

According to the method of the current invention, conventional proppant 21 of choice for the initial fracturing of subterranean zone 12 may be any untreated proppant. However, as the fracturing process continues, the current invention utilizes a coated proppant 20. The conversion to coated proppant 20 should occur at a point in time sufficient to ensure that at least the last 5% of the fracture adjacent to wellbore 10 is filled with coated proppant 20. More preferably, at least the last 30% of the portion of the fracture adjacent to wellbore 10 will be filled with coated proppant 20. Optionally, the interior of casing 14 will be filled with coated proppant 20. When casing 14 has not been cemented within wellbore 10, coated proppant 20 may optionally fill the annulus between the walls of wellbore 10 and casing 14.

Alternatively, subterranean formation 12 may be fractured prior to the injection of coated proppant 20 into subterranean formation 12. Upon the creation of one or more fractures 22, coated proppant 20 can be pumped into fractures 22 as described above. Once set or cured, consolidated proppant 20, located in fracture 22, props fracture 22 open and screens out formation particulate matter.

After coated proppant 20 has been packed into wellbore 10 as described above, the coating is allowed or caused to consolidate proppant 20 as a solid or nearly solid mass. If the coating is a hardenable resin, then the hardenable resin composition is caused to harden by heat from the subterranean zone 12 or by contacting it with a hardening agent as described below. When coated proppant 20 hardens, it consolidates into a fluid permeable mass capable of filtering out and preventing the migration of particulate matter with fluids produced from unconsolidated subterranean zone 12 into wellbore 10.

The substrate for coated proppant 20 is preferably graded sand having a mesh size chosen to prevent the particulate matter from passing through the consolidated permeable sand mass. The sand generally has a particle size in the range of from about 10 to about 70 mesh, U.S. Sieve Series. Preferred sand particle size distribution ranges are 1 or more of 10–20 mesh, 20–40 mesh, 40–60 mesh or 50–70 mesh, depending on the particle size and distribution of the particulate matter to be screened out by coated proppant 20. Preferably, coated proppant 20 will have a mesh size of 20–40 or 40–60 mesh.

The graded sand can be coated with a curable resin, a tackifying agent or mixtures thereof and mixed with a carrier liquid to form a slurry on site or the graded sand can be both coated and slurried on site. The hardenable resin compositions useful for coating sand and consolidating it into a hard fluid permeable mass generally comprise a hardenable organic resin and a resin-to-sand coupling agent. Such resin compositions are well known to those skilled in the art, as is their use for consolidating sand into hard fluid permeable masses. A number of such compositions are described in detail in U.S. Pat. No. 4,042,032 issued to Anderson, et al. on Aug. 16, 1977, U.S. Pat. No. 4,070,865 issued to McLaughlin on Jan. 31, 1978, U.S. Pat. No. 4,829,100 issued to Murphey, et al. on May 9, 1989, U.S. Pat. No. 5,058,676 issued to Fitzpatrick, et al. on Oct. 22, 1991 and U.S. Pat. No. 5,128,390 issued to Murphey, et al. on Jul. 7, 1992, all of which are incorporated herein by reference.

Examples of hardenable organic resins particularly suitable for use in accordance with this invention include but are not limited to novolac resins, polyepoxide resins, polyester resins, phenol-aldehyde resins, urea-aldehyde resins, furan resins and urethane resins. Additionally, compositions of the type disclosed in U.S. Pat. Nos. 5,232,961; 6,047,772 and 6,003,600, all of which are incorporated herein by reference, will also function in the current invention. These resins are available at various viscosities depending upon the molecular weights of the resins. The preferred viscosity of the organic resin used is generally in the range of from about 1 to about 1000 centipoises at 80° F. (26.7° C.). However, as will be understood, resins of higher viscosities can be utilized when mixed or blended with one or more diluents. Diluents generally useful with all of the various resins mentioned above include but are not limited to dipropylene glycol methyl ether, dipropylene glycol dimethyl ether, phenols, formaldehydes, furfuryl alcohol and furfural, ketones, ethers, aromatics, alcohols, fatty acid esters.

The resin-to-sand coupling agent is utilized in the hardenable resin compositions to promote coupling or adhesion to sand or other similar proppants. Particularly suitable coupling agents are aminosilane compounds or mixtures of such compounds. A preferred such coupling agent is N-Beta-(aminoethyl)-gamma-aminopropyltrimethoxysilane.

As mentioned, the resin composition hardens when exposed to formation temperatures greater than about 15° C. (60° F.) or when contacted with a hardening agent. When a hardening agent is utilized, it can be included in the resin composition (internal hardening agent) or the resin composition can be contacted with the hardening agent after the resin composition coated proppant 20 has been placed in subterranean formation 12 (external hardening agent). After a period of time sufficient to permit proper placement of coated proppant 20 within subterranean formation 12, use of an internal hardening agent will cause the resin composition to harden. Retarders or accelerators for lengthening or shortening the cure times can also be included in the formulation. When an external hardening agent is used, the hardenable resin composition coated proppant 20 is first placed in fracture 22 or borehole 10 followed by an overflush solution containing the external hardening agent. Examples of suitable internal hardening agents which can be used include hexachloroacetone, 1,1,3-trichlorotrifluoroacetone, benzotrichloride, benzylchloride and benzalchloride. Examples of suitable external hardening agents include benzotrichloride, acetic acid, formic acid and inorganic acids such as hydrochloric acid. The hardenable resin compositions can also include surfactants, dispersants and other additives that are well known to those skilled in the art.

Resin coated proppant 20 used in accordance with this invention can be prepared in accordance with conventional batch mixing techniques followed by the suspension of resin coated proppant 20 in a viscous carrier liquid. Alternatively, the carrier liquid containing hardenable resin composition coated proppant can be prepared in a substantially continuous manner such as in accordance with the methods disclosed in U.S. Pat. No. 4,829,100 issued to Murphey, et al. on May 9, 1989 or U.S. Pat. No. 5,128,390 issued to Murphey, et al, on Jul. 7, 1992. Typically, the resin is coated onto dry proppant before being mixed with viscous carrier fluid.

The tackifying compound comprises a liquid or a solution of a compound capable of forming at least a partial coating upon proppant 20 with which it is admixed prior to or subsequent to placement in subterranean formation 12. In some instances, the tackifying compound may be a solid at ambient surface conditions and upon initial admixing with proppant 20 and after heating upon entry into wellbore 10 becomes a melted liquid which at least partially coats a portion of proppant 20. Compounds suitable for use as a tackifying compound comprise substantially any compound which when in liquid form or in a solvent solution will form a non-hardening coating, by themselves, upon proppant 20 which facilitates agglomeration.

A particularly preferred group of tackifying compounds comprises polyamides. The preferred polyamides are liquids or in a solvent solution at the temperature of subterranean formation 12 to be treated. In this form the polyamides are non-hardening when present on proppant 20 introduced into subterranean formation 12. A particularly preferred compound is a condensation reaction product comprised of commercially available polyacids and a polyamine. Such commercial products include compounds such as mixtures of $C_{36}$ dibasic acids containing some trimer and higher oligomers and also small amounts of monomer acids which are reacted with polyamines. Other polyacids include trimer acids, synthetic acids produced from fatty acids, maleic anhydride and acrylic acid and the like. Such acid compounds are available from companies such as Witco, Union Camp, Chemtall, and Emery Industries. The reaction products are available from, for example, Champion Chemicals, Inc. and Witco.

In general, the polyamides of the present invention are commercially produced in batchwise processing of polyacids predominately having two or more acid functionalities per molecule with a polyamine. As is well known in the manufacturing industry, the polyacids and polyfunctional amines are introduced into a reactor where, with agitation, the mildly exothermic formation of the amine salt occurs. After mixing, heat is applied to promote endothermic dehydration and formation of the polymer melt by polycondensation. The water of reaction is condensed and removed leaving the polyamide. Choice and ratio of feedstock, heating rate, and judicious use of monofunctional acids and amines to terminate chain propagation provide control over the molecular weight and final properties of the polymer. Generally an excess of polyamine is present to prevent runaway chain propagation. Unreacted amines can be removed by distillation, if desired. Often a solvent, such as an alcohol, is admixed with the final condensation reaction product to produce a liquid solution that can readily be handled. The condensation reaction generally is accomplished at a temperature of from about 225° F. (107° C.) to about 450° F. (232° C.) under a nitrogen sweep to remove the condensed water from the reaction. The polyamines can comprise, for example, ethylenediamine, diethylenetriamine, triethylene tetraamine, amino ethyl piperazine and the like.

The polyamides can be converted to quaternary compounds by reaction with methylene chloride, dimethyl sulfate, benzylchloride, diethyl sulfate and the like. Typically the quaternization reaction would be effected at a temperature of from about 100° (37.8° C.) to about 200° F. (93.3° C.) over a period of from about 4 to 6 hours.

The quaternization reaction may be employed to improve the chemical compatibility of the tackifying compound with the other chemicals utilized in the treatment fluids. Quaternization of the tackifying compound can reduce effects upon breakers in the fluids and reduce or minimize the buffer effects of the compounds when present in various fluids.

Additional compounds which may be utilized as tackifying compounds include liquids and solutions of, for example, polyesters, polyethers and polycarbamates, polycarbonates, natural resins such as shellac and the like. Further, tackifying compounds of the type described in U.S. Pat. Nos. 5,787,986, 5,839,510, or 5,833,000 each entitled "Control Of Particulate Flowback In Subterranean Wells," incorporated herein by reference, will perform satisfactorily in the current invention.

The tackifying compound is admixed with proppant 20 in an amount of from about 0.1 to about 3.0 percent active material by weight of coated proppant 20. It is to be understood that larger quantities may be used, however, the larger quantities generally do not significantly increase performance and could undesirably reduce the permeability of coated proppant 20 pack. Preferably, the tackifying compound is admixed with proppant 20 introduced into subterranean formation 12 in an amount of from about 0.25 to about 2.0 percent by weight of coated proppant 20.

Optionally, the tackifying compound is utilized with another material desired to be admixed with proppant 20 and to be at least partially coated with the tackifying compound, such as glass fibers or the like. In such instances, the tackifying compound is present in an amount of from about 10 to about 250 percent active material by weight of the added material. The final concentration of tackifying agent remains from about 0.1 to about 3 percent active material by weight of the quantity of proppant 20 with which the coated material is intimately admixed. Preferably the tackifying compound is present in an amount of from about 50 to about 150 percent of the material, which is to be at least partially coated with the tackifying compound and then added to proppant 20. At least a portion of the tackifying compound introduced with the additional material will contact and coat at least a portion of proppant 20 with which it is admixed.

The carrier liquid can be any of the commonly used fracturing fluids gelled water, oil base liquids, foams or emulsions. The foams utilized have generally been comprised of water based liquids containing one or more foaming agents foamed with a gas such as nitrogen. The emulsions have been formed with two or more immiscible liquids. A particularly useful emulsion comprise a water based liquid and a liquefied gas such as nitrogen. Follow release of pressure on wellbore 10, the liquefied gas vaporizes and rapidly flows out of the formation.

The preferred fracturing fluid for use in accordance with this invention is comprised of an aqueous liquid such as fresh water or salt water combined with a gelling agent for increasing the viscosity of the liquid. The increased viscosity reduces fluid loss and allows the carrier liquid to transport significant concentrations of hardenable resin or proppant coated with tackifying compound into the subterranean zone to be completed.

A variety of gelling agents have been utilized including hydratable polymers which contain one or more functional groups such as hydroxyl, cis-hydroxyl, carboxyl, sulfate, sulfonate, amino or amide. Particularly useful polymers include polysaccharides and derivatives thereof that contain one or more monosaccharides units such as galactose, mannose, glucoside, glucose, xylose, arabinose, fructose, glucuronic acid or pyranosyl sulfate. Various natural hydratable polymers contain the foregoing functional groups and units including guar gum and derivatives thereof, cellulose and derivatives thereof, and the like. Hydratable synthetic polymers and co-polymers that contain the above mentioned functional groups can also be utilized including polyacrylate, polymethylacrylate, polyacrylamide, and the like.

Particularly preferred hydratable polymers which yield high viscosities upon hydration at relatively low concentrations are guar gum and guar derivatives such as hydroxypropyl guar, carboxymethyl guar, and carboxymethylhydroxypropyl guar and cellulose derivatives such as hydroxyethylcellulose, carboxymethylcellulose and the like.

Combining cross-linking agents with the polymer solutions can increase the viscosities of aqueous polymer solutions of the types described above. Examples of cross-linking agents include multivalent metal salts or compounds capable of releasing such metal ions in an aqueous solution.

The above described gelled or gelled and cross-linked carrier liquids/fracturing fluids can also include gel breakers such as those of the enzyme type, the oxidizing type or the acid buffer type all of which are well known to those skilled in the art. The gel breakers cause the viscous carrier liquids/fracturing fluids to revert to thin fluids that can be produced back to the surface after they have been utilized.

Once coated proppant 20 has cured or set, an expandable well screen 24 is installed in the area of wellbore 10 adjacent to fractures 22. Typically, prior to installation of well screen 24, wellbore 10 will be flushed with a brine solution or other suitable flush to ensure removal of any debris or obstruction. In prior art practices, installation of well screen 24 commonly occurred as fluid flowed from fractures 22. The produced fluid would contain particulate matter and proppant 21 which would complicate the installation process by fouling the downhole tools. The current invention avoids this problem, as solidified proppant 20 precludes passage of particulate matter normally carried by fluid flowing out of fractures 22. Once installed, expandable well screen 24 provides an added layer of protection and further controls the movement of particulate matter as the slots or openings of expanded well screen 24 will preferably be sized to preclude passage of most particulate matter or unconsolidated proppant 20 and/or 21.

As noted above, wellbore 10 may be filled with coated proppant 20 during the hydraulic fracturing step. Filling of wellbore 10 with coated proppant 20 is the preferred process when subterranean formation 12 is uncased as the curing or setting of proppant 20 will provide a degree of stability to the walls of wellbore 10. However, prior to installation of expandable well screen 24 in wellbore 10, any consolidated proppant bridges or obstructions must be drilled or reamed out. Preferably the drilling or reaming step will yield an opening equivalent to the expanded size of expandable well screen 24.

Conventional methods may be used to install expandable well screen 24 in either the cased or uncased subterranean formation 12. For example, in FIGS. 1–3, well screen 24 is attached to production pipe string 28 by a packer 26. However, other methods of attachment are also contemplated by the current invention. Following placement, a plug (not shown) passed upwards or downwards through well screen 24 expands well screen 24. When used within casing 14, well screen 24 substantially conforms to the interior of casing 14. In uncased subterranean formation 12, expanded well screen 24 provides additional stability to cured or solidified proppant 20. In both cased and uncased wells, wellbore 10 remains substantially clear of obstructions following expansion of well screen 24. Thus the current invention provides methods for reducing or precluding the production of particulate matter without obstructing access to regions of the well below the targeted subterranean formation 12.

While the present invention has been described with reference to FIGS. 1–3, other embodiments of the current invention will be apparent to those skilled in the art. Therefore, the foregoing specification is considered exemplary with the true scope and spirit of the invention being indicated by the following claims.

What is claimed is:

1. A method for completing a wellbore penetrating a subterranean formation comprising the steps of:
   fracturing the subterranean formation;
   filling a portion of each fracture adjacent to the wellbore with a coated proppant;
   allowing the coating on the proppant to set or cure; and,
   expanding an expandable well screen located within the wellbore adjacent to the fractures.

2. The method of claim 1, wherein the fracture is completely filled with the coated proppant.

3. The method of claim 1, wherein at least 5% of the fracture adjacent to the wellbore is filled with the coated proppant.

4. The method of claim 1, wherein at least 30% of the fracture adjacent to the wellbore is filled with the coated proppant.

5. The method of claim 1, wherein the proppant is graded sand having a mesh size in the range of about 10 to about 70 mesh, U.S. Sieve Series.

6. The method of claim 1, further comprising the step of placing and cementing a casing within the portion of the wellbore penetrating the subterranean formation.

7. The method of claim 1, further comprising the step of placing a casing within the portion of the wellbore penetrating the subterranean formation and filling the annulus between the wellbore wall and the casing with the coated proppant.

8. The method of claim 1, wherein the coating is a hardenable resin selected from the group consisting of novolac resins, polyepoxide resins, polyester resins, phenol-aldehyde resins, urea-aldehyde resins, furan resins and urethane resins.

9. The method of claim 1, wherein the step of fracturing the formation initially utilizes a fracturing fluid containing an uncoated proppant and subsequently the fracturing fluid contains a coated proppant.

10. The method of claim 1, wherein the step of fracturing the formation initially utilizes a fracturing fluid containing a coated proppant.

11. The method of claim 1, wherein the expandable well screen has a mesh size selected to preclude passage of the proppant.

12. A method for completing a wellbore penetrating a subterranean formation comprising the steps of:
   placing a casing in the portion of the wellbore penetrating the subterranean formation;
   perforating the casing;
   fracturing the subterranean formation;
   filling at least 5% of each fracture adjacent to the wellbore with a coated proppant;
   allowing the coating on the proppant to set or cure; and,
   expanding an expandable well screen located within the casing adjacent to the fractures.

13. The method of claim 12, wherein the fracture is completely filled with the coated proppant.

14. The method of claim 12, wherein at least 30% of each fracture adjacent to the wellbore is filled with the coated proppant.

15. The method of claim 12, further comprising the step of filling the annulus between the wellbore wall and the casing with the coated proppant.

16. The method of claim 12, further comprising the step of cementing the casing within the portion of the wellbore penetrating the subterranean formation.

17. The method of claim 12, wherein the proppant is graded sand having a mesh size in the range of about 10 to about 70 mesh, U.S. Sieve Series.

18. The method of claim 12, wherein the coating is a hardenable resin selected from the group consisting of novolac resins, polyepoxide resins, polyester resins, phenol-aldehyde resins, urea-aldehyde resins, furan resins and urethane resins.

19. The method of claim 12, wherein the step of fracturing the formation initially utilizes a fracturing fluid containing an uncoated proppant and subsequently the fracturing fluid contains a coated proppant.

20. The method of claim 12, wherein the step of fracturing the formation initially utilizes a fracturing fluid containing a coated proppant.

21. The method of claim 12, wherein the expandable well screen has a mesh size selected to preclude passage of the proppant.

22. A method for completing a wellbore penetrating a subterranean formation comprising the steps of:
   placing a perforated casing in the portion of the wellbore penetrating the subterranean formation;
   fracturing the subterranean formation;
   filling at least 30% of each fracture adjacent to the wellbore with a coated proppant;
   allowing the coating on the proppant to set or cure; and,
   expanding an expandable well screen located within the casing adjacent to the fractures.

23. The method of claim 22, wherein the fracture is completely filled with the coated proppant.

24. The method of claim 22, wherein the proppant is graded sand having a mesh size in the range of about 10 to about 70 mesh, U.S. Sieve Series.

25. The method of claim 22, further comprising the step of cementing the casing within the wellbore.

26. The method of claim 22, further comprising the step of placing a casing within the portion of the wellbore penetrating the subterranean formation and filling the annulus between the wellbore wall and the casing with the coated proppant.

27. The method of claim 22, wherein the coating is a hardenable resin selected from the group consisting of novolac resins, polyepoxide resins, polyester resins, phenol-aldehyde resins, urea-aldehyde resins, furan resins and urethane resins.

28. The method of claim 22, wherein the step of fracturing the formation initially utilizes a fracturing fluid containing an uncoated proppant and subsequently the fracturing fluid contains a coated proppant.

29. The method of claim 22, wherein the step of fracturing the formation initially utilizes a fracturing fluid containing a coated proppant.

30. The method of claim 22, wherein the expandable well screen has a mesh size selected to preclude passage of the proppant.

31. A method for completing a wellbore penetrating a subterranean formation comprising the steps of:

placing a casing in the portion of the wellbore penetrating the subterranean formation;

fracturing the subterranean formation with a fluid containing a proppant;

filling at least 30% of the region of each fracture adjacent to the wellbore and the annulus around the casing in the region of the fracture with a coated proppant;

allowing the coating on the proppant to set or cure; and, expanding an expandable well screen located within the casing adjacent to the fractures.

32. The method of claim 31, wherein the fracture is completely filled with the coated proppant.

33. The method of claim 31, wherein the proppant is graded sand having a mesh size in the range of about 10 to about 70 mesh, U.S. Sieve Series.

34. The method of claim 31, further comprising the step of cementing the casing within the wellbore.

35. The method of claim 31, further comprising the step of filling the annulus between the wellbore wall and the casing with the coated proppant.

36. The method of claim 31, wherein the coating is a hardenable resin selected from the group consisting of novolac resins, polyepoxide resins, polyester resins, phenol-aldehyde resins, urea-aldehyde resins, furan resins and urethane resins.

37. The method of claim 31, wherein the step of fracturing the formation initially utilizes a fracturing fluid containing an uncoated proppant and subsequently the fracturing fluid contains a coated proppant.

38. The method of claim 31, wherein the step of fracturing the formation initially utilizes a fracturing fluid containing a coated proppant.

39. The method of claim 31, wherein the expandable well screen has a mesh size selected to preclude passage of the proppant.

\* \* \* \* \*